3,313,756
SOLUTIONS OF POLYVINYLENE CARBONATE
John B. Clements and Carlton C. Summers, Durham, N.C., and William E. Lanier, Danville, Ala., assignors to The Chemstrand Corporation, New York, N.Y., a corporation of Delaware
No Drawing. Filed Apr. 23, 1962, Ser. No. 189,259
8 Claims. (Cl. 260—29.6)

This invention relates to new compositions of matter. More particularly, the invention relates to new and useful compositions of matter comprising solutions of polyvinylene carbonate.

Polyvinylene carbonate possesses many excellent properties which makes it desirable for utilization in the manufacture of end products, such as films, fibers, filaments, coatings, shaped articles and the like. Polyvinylene carbonate can be converted into shaped articles in many ways. For example, it may be cast into films or forced through multi-hole spinnerets to form fibers or filaments. It is generally more convenient and efficient to employ the polymer in a solution regardless of the end use to which it is to be put. This is shown in the textile industry where polyvinylene carbonate is employed in the formation of fibers and filaments, which are manufactured by several methods of spinning, such as dry spinning and wet spinning.

In the dry spinning method of fiber formation the polymer is dissolved in a suitable solvent and subsequently extruded from spinnerets into a heated atmosphere in order to evaporate the polymer.

In order to form fibers by the wet spinning method, the polymer is dissolved in a suitable solvent and extruded from a spinneret into a coagulating bath capable of leaching the solvent from the fibers. Normally, this method may be carried out at temperatures much lower than either the melt spinning or dry spinning methods. If it is desired to use additives, such as anti-static agents, fire retarding agents, dyes, plasticizers and the like, in the polymer solution, they may be incorporated therein without the danger of decomposition or seriously effecting the properties of the end product where the wet spinning method of filament formation is employed. It is much easier to introduce such additives into a solution than to introduce them into a molten composition. In addition, solutions are much easier to handle during processing, and in many cases may be stored for long periods of time without a change of physical and chemical properties. Further, it is easier to cast a film from a solution than to cast it from a molten composition. From the above discussion it is apparent that solutions of polymers possess many distinct advantages over molten compositions in the manufacture of end products.

It is an object of this invention to prepare polyvinylene carbonate solutions or "dopes" which are capable of being transformed into shaped articles.

It is another object of this invention to provide polyvinylene carbonate compositions in solutions which are stable and have non-gelling characteristics.

It is a further object of this invention to prepare spinnable solutions of polyvinylene carbonate compositions.

Other objects and advantages of the invention will be apparent from the following description.

It has been found that the objects of this invention are accomplished by dissolving polyvinylene carbonate in a solvent mixture comprising dimethyl sulfoxide and an aliphatic hydroxy compound or water. These solutions of polyvinyl carbonate can be prepared faster and at a lower temperature using a mixture of dimethylsulfoxide and an aliphatic hydroxy compound or water as compared to the use of dimethylsulfoxide alone. Solutions of polyvinylene carbonate in a mixture of dimethylsulfoxide and an alcohol or water are cheaper and give better results in a wet spinning of fibers also. These solutions have been found to be quite adaptable to the wet spinning process discussed above. The polyvinylene carbonate embraced by this invention has the following formula

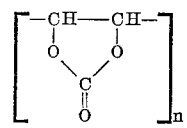
Formula I

Normally, $n$ is an integer having a value of at least 10. Vinylene carbonate is prepared by chlorinating ethylene carbonate, dehydrohalogenating the product and then refluxing the bulk polymer with small weight percentages of sodium borohydride. The high molecular weight polyvinylene carbonate is prepared from the monomer by free radical initiation. A good discussion of the preparation of polyvinylene carbonate may be found in "Preparative Methods of Polymer Chemistry," by Wayne R. Sorenson and Tod W. Campbell, published in 1961, pages 188–189.

The solvents used in this invention are mixtures of dimethylsulfoxide and a composition of matter having the formula $$R—(OH)_{n_1}$$ Formula II wherein R is hydrogen, a straight chain hydrocarbon radical of 1 to 20 carbon atoms, or a branch chain hydrocarbon radical of 3 to 20 carbon atoms and $n_1$ is an integer having a value of 1 to 6. Among suitable compounds falling within the scope of Formula II are water, methyl alcohol, ethyl alcohol, n-propyl alcohol, isopropyl alcohol, allyl alcohol, n-butyl alcohol, isobutyl alcohol, secondary butyl alcohol, tertiary butyl alcohol, n-amyl alcohol, iso-amyl alcohol, tertiary amyl alcohol, n-hexyl alcohol, n-octyl alcohol, capryl alcohol, n-decyl alcohol, lauryl alcohol, myristyl alcohol, cepyl alcohol, stearyl alcohol, ethylene glycol, hexamethylene glycol, glycerol, erythritol, 1,2-propylene glycol, 1,3-propylene glycol, 2-ethyl hexyl alcohol, 1,2-butane diol, 1,3-butane diol, 1,4-butane diol, 2,3-butane diol and the like. Particularly advantageous for use in this invention are those aliphatic hydroxy compounds having from 1 to 4 carbon atoms and one hydroxyl group per molecule, such as methyl alcohol, ethyl alcohol, n-propyl alcohol, isopropyl alcohol, allyl alcohol, n-butyl alcohol, isobutyl alcohol, secondary butyl alcohol, tertiary butyl alcohol, and the like.

To prepare solutions and dopes suitable for spinning into filaments and fibers, 10 to 25 percent by weight of the polyvinylene carbonate based on the total weight of the solution is suitable. It is preferred to employ 20 percent of the polymer, based on the total weight of the solution, when the solution is to be used for the preparation of fibers and filaments. When the solution is to be employed for other purposes, such as coating or lacquer and the like, as little as 5 percent and as much as 30 percent of the polymer may be utilized.

The solvent mixture may consist of 50 percent to 99 percent by weight of dimethylsulfoxide and from about 1 percent to about 50 percent by weight of a lower aliphatic hydroxy compound or water. A preferred solvent mixture consists of about 85 percent of dimethylsulfoxide and about 15 percent of a lower aliphatic hydroxy compound or water.

Solutions of high solids content and good stability can be prepared by admixing the polyvinylene carbonate in the solvent mixture and heating to a temperature in a range of about 20° C. to about 100° C. A preferred temperature range would be from about 40° C. to about 60° C. If desired the mixture may be stirred while heating. However, stirring is not necessary to effect solution, although it has been found that the polymer goes into solution more smoothly and evenly with a greater rate of speed when stirring is employed. The maximum solids content of the polymer that can be obtained in the solution and the viscosity of the solution depend upon the nature of the solvent mixture and the temperature employed.

In the manufacture of filaments and fibers a polyvinylene carbonate having an inherent viscosity of at least approximately 0.5 is usually employed. The inherent viscosity of polyvinylene carbonate is measured when the polymer is dissolved in a suitable solvent. The inherent viscosity of the polymer is determined as $$\frac{\log_e \eta r}{C} \quad \text{Formula III}$$

in which $\eta r$ is the flow time of a very dilute solution (e.g., 0.4 percent) of the polymer solution through a capillary tube divided by the flow time of the solvent through a similar capillary tube at the same temperature (e.g., 25° C.) and in the same units, and C is the concentration of polymer in grams per 100 ml. of solution. The polyvinylene carbonate solutions of this invention were found to have an inherent viscosity of about 1.9. The concentration used in this determination was 0.4 gram of polymer per 100 ml. of solution.

The properties of the articles formed from the compositions herein described may be modified by appropriate modification of the composition. The composition of this invention may have incorporated therein various modifying agents such as dyes, pigments, plasticizers, resins, diluents, cellulose derivatives, water repellents, waxes, luster modifying agents, flame repellents and the like.

Fibers and filaments can be prepared by either dry spinning or wet spinning into suitable coagulating baths. The compositions of the present invention are particularly useful for wet spinning processes. The fibers are spun by extruding the polyvinylene carbonate solution through an orifice or a spinneret having a plurality of orifices into a medium which removes the solvent. The volume of the solution passed through the spinneret per unit of time must be constant in order to produce a fiber of uniform size. This is best achieved by using a pump adapted to deliver a constant flow of solution regardless of minor changes in viscosity and regardless of the resistance offered by the spinneret. The polymer solution may be delivered to the pump by means of pressure applied by an inert gas to the liquid surface of the solution reservoir which must be heated to maintain the solution fluid enough to pass through the conduits. The extruding operation should be conducted at elevated temperatures, but far enough below the boiling point of the solvent to prevent bubbles or other irregularities in the fiber. The solvent is leached out of the stream of polymer solution, which first becomes a viscous stream and finally a solid filament. When a spinneret with a plurality of apertures is used the several streams of polymer converge and ultimately form a single fiber. The spin bath must necessarily be of sufficient size to permit complete, or substantially complete, removal of the solvent. The speed of extrusion will effect the size of the spin bath, high speeds requiring much longer baths. The temperatures of the bath also effect the size, higher temperatures permitting more rapid diffusion of the solvent from the fiber and enabling the use of short baths. Automatic machinery for spinning continuously, drying the thread if necessary, and winding it on suitable spools may be modified with the teaching of this specification. As in the case of most synthetic fibers, the fibers of polyvinylene carbonate spun from dimethylsulfoxide solutions may be stretched to develop optimum physical properties. If desired, part of the necessary stretching may be accomplished in the spinning medium by drawing the fiber out of the bath at a rate more rapid than the rate of extrusion.

Although specific reference has been made to the use of solutions for the formation of fibers and filaments, the invention is not restricted thereto, since the solutions are useful for forming a variety of objects irrespective of the shape of the object. Typical objects which can be formed from the solutions are sheets, ribbons, bristles, and plasticized or otherwise modified solid compositions useful for making molded articles. The solutions are also useful for application as lacquers on wood, metal, glass and other surfaces, for coating fabrics, wire, regenerated cellulose, and the like, and for impregnating fabric and other porous material.

The following examples in which parts, proportions and percentages are by weight illustrate further the application of the principles of the invention.

Example I

Polyvinylene carbonate and solvent mixtures in amounts appropriate to make a 20 percent solution of polyvinylene carbonate by weight were charged into test tubes and these were installed in an oil bath at 25° C. The bath was then heated and the time and temperature required to cause solution was recorded. The results are given in the following table.

| Solvent Mixture | Ratio by Wt. | Time, Min. | Temp. Max., ° C. | Appearance of Solution |
|---|---|---|---|---|
| DMSO | Alone | 60 | 90 | Colorless clear, viscous solution. |
| DMSO/H$_2$O | 90/10 | 20 | 70 | Do. |
| DMSO/CH$_3$OH | 90/10 | 25 | 65 | Do. |
| DMSO/CH$_3$OH | 60/40 | 20 | 70 | Do. |
| DMSO/C$_2$H$_5$OH | 90/10 | 30 | 65 | Do. |
| DMSO/C$_2$H$_5$OH | 60/40 | 60 | 95 | Hazy, cleared to colorless solution upon standing at 25° C. |
| DMSO/i-C$_3$H$_7$OH | 90/10 | 30 | 65 | Colorless, clear, viscous solution. |
| DMSO/m-C$_4$H$_9$OH* | 75/25 | | 50 | Do. |

*15% by weight solution of polyvinylene carbonate prepared in the mixture.
DMSO used above refers to dimethyl sulfoxide.

The solutions formed above were suitable for the formation of fibers or filaments by the wet or dry methods of spinning.

Example II

A mixture comprising 20 grams of polyvinylene carbonate having an inherent viscosity of 1.13, 32 grams of methanol and 48 grams of dimethylsulfoxide was heated at a temperature of 75–80° C. for approximately 40 minutes. A clear viscous solution suitable for the formation of fibers by both wet and dry spinning methods was obtained. This solution was spun into fibers using a conventional wet spinning apparatus equipped with a spin bath composed of water at a temperature of 33° C. The fiber obtained was found to have the following physical characteristics:

Denier _____ 3.16 grams/9000 meters.
Tenacity _____ 4.67 grams/denier.
Elongation _____ 9.38%.

As many widely different embodiments of this invention may be made without departing from the spirit and scope thereof it is to be understood that the invention is not limited to the specific embodiments thereof except as defined in the appended claims.

We claim:
1. A composition of matter consisting essentially of from about 5 to 30 percent, based on the total weight of the composition, of polyvinylene carbonate of the formula

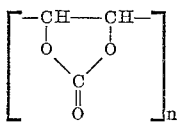

wherein $n$ is an integer having a value of at least 10 and a solvent consisting essentially of a mixture of from about 50 to 99 percent, base on the total weight of the solvent, of dimethylsulfoxide and from about 1 to 50 percent, based on the total weight of the solvent, of a compound selected from the group consisting of water and aliphatic monohydroxy compounds having from 1 to 4 carbon atoms and containing only carbon, hydrogen, and oxygen.

2. A fiber-forming composition of matter consisting essentially of from about 10 to 25 percent, based on the total weight of the composition, of polyvinylene carbonate of the formula

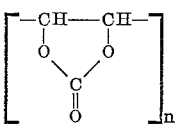

wherein $n$ is an integer having a value of at least 10 and a solvent consisting essentially of a mixture of from about 50 to 99 percent, based on the total weight of the solvent, of dimethylsulfoxide and from about 1 to 50 percent, based on the total weight of the solvent, of a compound selected from the group consisting of water and aliphatic monohydroxy compounds having from 1 to 4 carbon atoms and containing only carbon, hydrogen, and oxygen.

3. A fiber-forming composition of matter consisting essentially of about 20 percent, based on the total weight of the composition, of polyvinylene carbonate of the formula

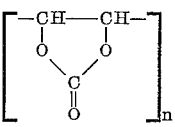

wherein $n$ is an integer having a value of at least 10 and a solvent consisting essentially of a mixture of 85 percent, based on the total weight of solvent, of of dimethylsulsulfoxide and 15 percent, based on the total weight of solvent, of a compound selected from the group consisting of water and aliphatic monohydroxy compounds having from 1 to 4 carbon atoms and containing only carbon, hydrogen, and oxygen.

4. A fiber-forming composition of matter consisting essentially about 20 percent by weight, based on the total weight of the composition, of polyvinylene carbonate of the formula

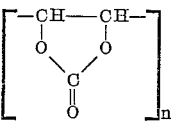

wherein $n$ is an integer having a value of at least 10 and a solvent consisting essentially of a mixture of 90 percent by weight, based on the total weight of the solvent, of dimethylsulfoxide and 10 percent by weight, based on the total weight of the solvent, of water.

5. A fiber-forming composition of matter consisting essentially about 20 percent by weight, based on the total weight of the composition, of polyvinylene carbonate of the formula

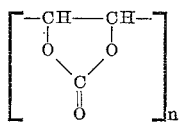

sentially of about 20 percent by weight, based on the total solvent consisting essentially of a mixture of from about 60 to 90 percent by weight, based on the total weight of the solvent, of dimethylsulfoxide and from about 40 to 10 percent by weight, based on the total weight of the solvent, of methanol.

6. A fiber-forming composition of matter consisting essentially of about 20 percent by weight base on the total weight of the composition, of polyvinylene carbonate of the formula

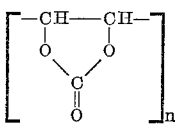

wherein $n$ is an integer having a value of at least 10 and a solvent consisting essentially of a mixture of 90 percent by weight, based on the total weight of the solvent, of dimethylsulfoxide and 10 percent by weight, based on the total weight of the solvent, of ethanol.

7. A fiber-forming composition of matter consisting essentially of about 20 percent by weight base on the total weight of the composition, of polyvinylene carbonate of the formula

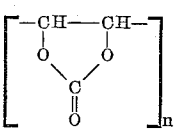

wherein $n$ is an integer having a value of at least 10 and a solvent consisting essentially of a mixture of 90 percent by weight, based on the total weight of the solvent, of dimethylsulfoxide and 10 percent by weight, based on the total weight of the solvent, of propanol.

8. A fiber-forming composition of matter consisting essentially of about 15 percent by weight, based on the total weight of the composition, of polyvinylene carbonate of the formula

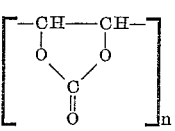

wherein $n$ is an integer having a value of at least 10 and a solvent consisting essentially of a mixture of 90 percent by weight, based on the total weight of the solvent, of dimethylsulfoxide and about 10 percent by weight, based on the total weight of the solvent, of butanol.

References Cited by the Examiner

UNITED STATES PATENTS

| | | | |
|---|---|---|---|
| 2,694,658 | 11/1954 | Crepeau et al. | 134—26 |
| 2,858,288 | 10/1958 | Ehlers et al. | 260—30.8 |
| 2,930,779 | 3/1960 | Drechsel. | |
| 2,993,030 | 7/1961 | Ham et al. | |
| 3,063,955 | 11/1962 | Kass et al. | 260—30.8 |
| 3,069,391 | 12/1962 | Schaefgen. | |

MORRIS LIEBMAN, *Primary Examiner.*

A. O. DENT, B. A. AMERNICK, *Assistant Examiners.*